United States Patent
Prescott et al.

(10) Patent No.: US 9,360,346 B2
(45) Date of Patent: *Jun. 7, 2016

(54) MONITORING A BLACK CELL ENVIROMENT IN REAL-TIME

(71) Applicant: FLUOR TECHNOLOGIES CORPORATION, Aliso Viejo, CA (US)

(72) Inventors: Clifford Neal Prescott, Houston, TX (US); Bennett Woods, Missouri City, TX (US); Albert Touma, Houston, TX (US); Timothy Paul Daigle, Pearland, TX (US)

(73) Assignee: Fluor Technologies Corporation, Sugar Land, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/798,189

(22) Filed: Jul. 13, 2015

(65) Prior Publication Data

US 2015/0338249 A1    Nov. 26, 2015

Related U.S. Application Data

(63) Continuation of application No. 14/169,839, filed on Jan. 31, 2014, now Pat. No. 9,110,226.

(60) Provisional application No. 61/759,869, filed on Feb. 1, 2013.

(51) Int. Cl.
    *G02B 6/00* (2006.01)
    *G01D 5/26* (2006.01)
    (Continued)

(52) U.S. Cl.
    CPC . *G01D 5/268* (2013.01); *B23P 6/00* (2013.01); *G02B 6/10* (2013.01); *G02B 6/34* (2013.01);
    (Continued)

(58) Field of Classification Search
    CPC ........ G01L 1/246; G02B 6/022; G01H 9/004; G01D 5/353
    USPC .................................... 385/12, 13, 53, 88, 92
    See application file for complete search history.

(56) References Cited

U.S. PATENT DOCUMENTS 6,004,070 A    12/1999  Van Camp
6,572,081 B2    6/2003  Griffioen
(Continued)

FOREIGN PATENT DOCUMENTS

DE         3000640      7/1981
WO       2014001714     1/2014

OTHER PUBLICATIONS

S. J. Ball et al, "Task 1—Instrumentation in VHTRS for Process Heat Applications", Oct. 2010.

*Primary Examiner* — Jennifer Doan
(74) *Attorney, Agent, or Firm* — Conley Rose, P.C.; Kristin Jordan Harkins

(57) ABSTRACT

A system of monitoring a black cell environment using sensors is presented, in which the sensors can be easily replaced during a sealed period of the black cell environment. The black-cell monitoring system includes at least one sealed vessel that is disposed within the black cell environment. The vessel is configured to store a hazardous mixed substance and is sealed from the external environment for a pre-determined amount of time. The black-cell monitoring system also includes at least one tubing that extends from the outside of the vessel to the inside of the vessel. The black-cell monitoring system also includes a fiber optic cable that is disposed within the lumen of the tubing. At least a portion of the fiber optic cable is disposed within a portion of the tubing located inside the sealed vessel.

31 Claims, 4 Drawing Sheets

(51) Int. Cl.
*G02B 6/34* (2006.01)
*G02B 6/50* (2006.01)
*G02B 6/44* (2006.01)
*G21F 7/00* (2006.01)
*G21F 7/02* (2006.01)
*B23P 6/00* (2006.01)
*G02B 6/10* (2006.01)
*G21F 5/002* (2006.01)

(52) U.S. Cl.
CPC .............. *G02B 6/4415* (2013.01); *G02B 6/50* (2013.01); *G21F 7/00* (2013.01); *G21F 7/02* (2013.01); *G21F 5/002* (2013.01); *Y10T 29/49732* (2015.01); *Y10T 29/49828* (2015.01)

(56) References Cited

U.S. PATENT DOCUMENTS

| | | |
|---|---|---|
| 6,648,552 B1 | 11/2003 | Smith |
| 7,336,862 B1 | 2/2008 | Xai et al. |
| 7,796,844 B2 | 9/2010 | Tam et al. |
| 8,280,202 B2 | 10/2012 | Xia |
| 9,110,226 B1 * | 8/2015 | Prescott .................... G21F 7/00 |

* cited by examiner

105

Central Monitoring Device 230
220
225
200
205
210
215

MONITORING A BLACK CELL ENVIROMENT IN REAL-TIME

This application is a continuation application of U.S. application Ser. No. 14/169,839 filed on Jan. 31, 2014 which claims the benefit of U.S. Provisional Application No. 61/759,869, filed Feb. 1, 2013. These and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

The field of the invention is monitoring of a black cell environment.

BACKGROUND

The following description includes information that may be useful in understanding the present invention. It is not an admission that any of the information provided herein is prior art or relevant to the presently claimed invention, or that any publication specifically or implicitly referenced is prior art.

Treatment of radioactive waste has always been a challenge. Part of the reasons is that the radioactive waste usually remains hazardous for a long period of time (e.g., 40 years, 100 years) before it can be released. Until the hazardous level of the waste becomes acceptable, the waste is usually being treated in an isolated environment.

The Hanford Site, located in southeastern Washington State, was the largest of three defense production sites in the U.S. Over the span of 40 years, it was used to produce 64 metric tons of plutonium, helping end World War II and playing a major role in military defense efforts during the Cold War. As a result, 56 million gallons of radioactive and chemical wastes are now stored in 177 underground tanks on the Hanford Site.

To address this challenge, the U.S. Department of Energy contracted a US Contractor, to design and build the world's largest radioactive waste treatment plant. The Hanford Waste Treatment and Immobilization Plant (WTP), also known as the "Vit Plant," will use vitrification to immobilize most of Hanford's dangerous waste.

Some efforts have been made to monitor the physical and/or chemical status of highly radioactive environment. For example, Ball et al., in a publication titled "Task 1-Instrumentation in VHTRs for Process Heat Applications," published in October 2010, discloses a device, Thermocouple penetration assembly, to monitor the temperature distribution of the core graphite and metal components in high-radiation environment. In Ball's thermocouple penetration assembly, sheathed thermocouples are located in a protective tube that prevents the thermocouples from directly contacting the hazardous environment. However, Ball does not provide any means to replace the sheathed thermocouple can be replaceable without disassembling the entire thermocouple penetration assembly.

Similarly, international patent application WO 2014/001714 A1 to Pinet, titled "Device for detecting the level of a liquid contained in a container," published Jan. 3, 2014, discusses a device for detecting the level of liquid contained in a cooling pool of spent fuel of a nuclear reactor. Specifically, Pinet discloses a temperature sensor comprising an optical fiber with multiple Bragg gratings. However, Pinet's device is limited to measure the temperature and the water level in the radioactive container.

Other efforts have been made to monitor physical and/or chemical status of highly radioactive environment other than temperature. For example, U.S. Pat. No. 6,004,070 to Van Camp, titled "Waste storage containment cell, method of operating, and apparatus therefore," issued Dec. 21, 1999, discusses a covered landfill waste containment cell with a leak detection system. In Van Camp, the containment cell includes numerous leak monitor conduits surrounding the cell. The leak monitor conduit may contain a messenger cable or control cable, which can be a photosensitive fiber optic or other electronic devices. However, Van Camp only discloses that the conduits are embedded into the floor of the containment cells. Furthermore, the conduits include perforations on its surface to detect water leaked into the bottom of the cell so that the fiber optics in the conduits is directly exposed to the radioactive environment.

Another U.S. Pat. No. 6,648,552 to Smith et al., titled "Sensor system for buried waste containment sites," issued Nov. 18, 2003, discusses a sensor system for buried waste containment sites. In Smith et al., one or more access tubes are disposed in or below the barriers of the containment sites and sensor devices are disposed in the access tubes. The access tubes provide protection for the sensor device. Through the access tubes, sensors can be removed and deployed. Furthermore, one or more ends of the tubes containing sensors are exposed on the surface of the ground, by which sensor arrays can be easily installed or replaced. Yet, Smith only discloses that sensor devices are buried in the barriers of containment sites. Also, Smith's device is largely limited to the detection of radiation leakage through the barriers.

Thus, there is a need to determine the condition, in real time for operational safety, of certain Black Cells where pulse jet mixers mix the radioactive waste. The current design does not provide for monitoring or control. These Black Cells are highly radioactive and will be sealed for the 40-year operating life of the facility. New innovative health/status monitoring solutions are therefore needed.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Unless the context dictates the contrary, all ranges set forth herein should be interpreted as being inclusive of their endpoints, and open-ended ranges should be interpreted to include only commercially practical values. Similarly, all lists of values should be considered as inclusive of intermediate values unless the context indicates the contrary.

The recitation of ranges of values herein is merely intended to serve as a shorthand method of referring individually to each separate value falling within the range. Unless otherwise indicated herein, each individual value with a range is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

SUMMARY OF THE INVENTION

The present invention is directed to systems and methods for monitoring a black cell environment in real-time.

One aspect of the invention is a system for monitoring a black cell environment in real-time. The system includes a sealed vessel disposed within the black cell environment, which is configured to store a hazardous mixed substance. The system also includes a tubing extended from outside of the sealed vessel to inside of the sealed vessel. The system further comprises a fiber optic cable disposed within a lumen of the tubing. At least a portion of the fiber optic cable is disposed within a portion of the tubing located inside of the sealed vessel.

It is generally preferred that the sealed vessel comprises a pulse jet mixer, and the mixed substance is a radioactive substance. While not limiting to the inventive subject matter, it is generally preferred that the tubing comprises a first end and a second end, wherein both the first end and the second end of the tubing are disposed outside of the sealed vessel. It is contemplated that the lumen of the tubing may be sealed from a lumen of the vessel. It is also contemplated that the lumen of the tubing is sealed from the black cell environment. In other aspects, it is contemplated that the tubing comprises stainless steel.

In some embodiments, it is contemplated that the fiber optic cable is disposed in a spiral pattern inside the lumen of the tubing. In other aspects of some embodiments, the fiber optic cable includes a sensor, which preferably includes Fiber Bragg Gratings on the fiber optic cable. It is contemplated that the fiber optic cable further comprises a computing device coupled to at least one end of the fiber optic cable and configured to retrieve sensor data (e.g. temperature data, vibration data, and pressure data, etc.) from the sensor. It is also contemplated that the computing device is further configured to generate a three-dimensional profile of a condition of the mixed substance inside the sealed vessel based on the at least one of temperature data, vibration data, and pressure data.

Another aspect of the invention provides a method of replacing a sensor in a sealed vessel. The sealed vessel comprises a tubing that extends from the outside of the sealed vessel to the inside of the sealed vessel such that a first portion of the tubing is disposed inside the sealed vessel and a second portion of the tubing is disposed outside of the sealed vessel. The first step to replace the sensor in a sealed vessel is to dispose a first fiber optic cable comprising a first sensor within a lumen of the tubing in such a way that the first sensor is disposed within the lumen of the first portion of the tubing. In the second step, the first fiber optic cable is removed from the tubing. In the third step, a different second fiber optic cable comprising a second sensor is inserted into the tubing such that the second sensor is disposed within the lumen of the first portion of the tubing.

In one aspect of some embodiments, it is contemplated that the method of replacing a sensor further includes a step of retrieving sensor data (e.g. at least one of temperature data, vibration data, and pressure data) from the first sensor. In this embodiment, it is preferred to further include steps of generating a three-dimensional profile of a condition of the mixed substance inside the sealed vessel based on the at least one of temperature data, vibration data, and pressure data retrieved from the first sensor. In other aspect of some embodiments, it is preferred that the first fiber optic cable is removed from the tubing when a signal is detected from the first fiber optic cable. It is contemplated that the second fiber optic cable can be inserted by blowing the second fiber optic cable into the lumen of the tubing. It is also contemplated that the second fiber optic cable can be inserted by attaching a pig to an end of the second fiber optic cable.

Another aspect of the invention provides a method of installing a sensor in a sealed vessel. In the sealed vessel, a tubing extends from the outside of the sealed vessel to the inside of the sealed vessel such that a first portion of the tubing is disposed inside the sealed vessel and a second portion of the tubing is disposed outside of the sealed vessel. The sensor can be installed by inserting a fiber optic cable comprising a sensor into the tubing such that the sensor is disposed within the lumen of the first portion of the tubing. Various objects, features, aspects and advantages of the inventive subject matter will become more apparent from the following detailed description of preferred embodiments, along with the accompanying drawing figures in which like numerals represent like components.

DETAILED DESCRIPTION

Figure 1:
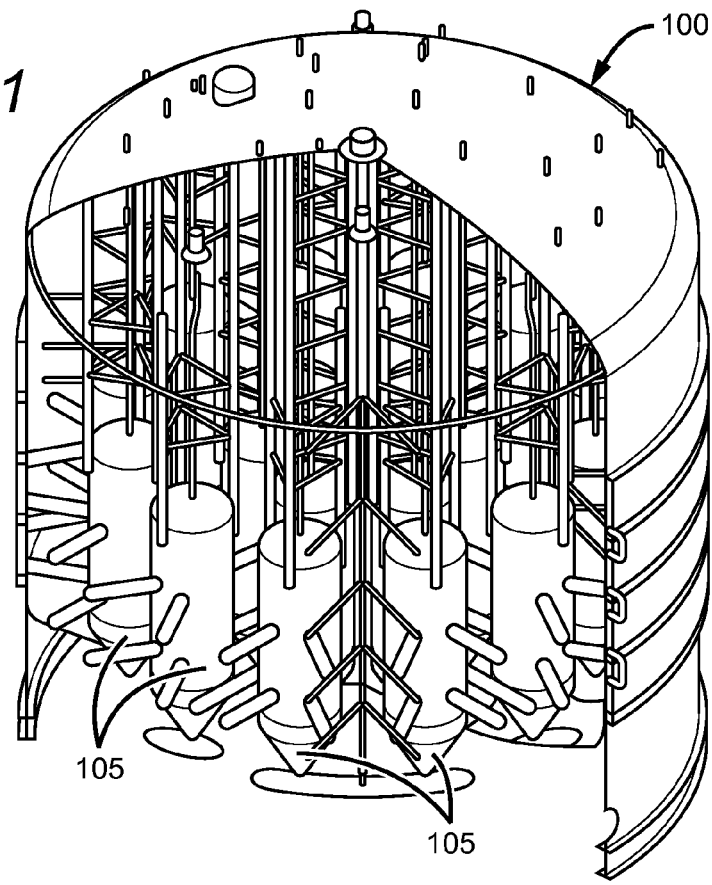
FIG. 1 illustrates a vessel of some embodiments that is configured to store radioactive materials.

Throughout the following discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

The inventive subject matter provides apparatus, systems and methods in which a black cell environment can be monitored in real-time. A black cell environment is defined herein as an isolated environment that is completely sealed off from the external environment for a period of time. The black cell environment can contain hazardous materials, such as radioactive materials. As such, the sealed off period can be an extended period of time. The sealed off period can be several hours, several days, several months, several years, 50 years, 100 years, etc. In some embodiments, the black cell environment is contained within sealed concrete.

In some embodiments, the hazardous materials can be stored within one or more vessels inside the black cell environment. The vessels can be of different shape and made with different materials. For example, the vessels can have a cubical shape, a cylindrical shape, a cuboidal shape, a pyramidal shape, a conical shape, etc. The vessels can be made of concrete, stainless steel, or any other material or combinations of materials that are suitable for containing a hazardous material.

The hazardous material that is stored within the vessels can be a mixture comprising liquids and solids. In some embodiments, the mixture comprises heavy metals such as plutonium, and uranium. If these heavy metals are allowed to be settled in the bottom, they could trap dangerous gases and cause explosions or trigger uncontrolled nuclear chain reactions. As such, in some of these embodiments, mixers such as pulse-jet mixers are disposed within the vessels to continuously stir the mixture inside the vessel during the sealed period.

FIG. 1 illustrates an example vessel 100 that can be placed in the black cell environment. In this example, the vessel 100 has a cylindrical shape. FIG. 1 also illustrates a portion of the interior of the vessel 100. As shown, the vessel 100 includes multiple pulse-jet mixers 105 configured to stir the mixture inside the vessel 100 during the sealed period. In some embodiments, several vessels that look identical or very similar to the vessel 100 can be placed in the black cell environment.

Because of the unstable nature of the mixture being stored in the vessels, it is contemplated that the condition of the mixture (and also the condition of the black cell environment) should be monitored. It is also contemplated that the condition of the mixture and of the black cell should be monitored in real-time so that any emergency situation can be immediately reported and any emergency procedure can be triggered in a timely fashion. For example, sudden change in radioactivity, temperature, pressure, and/or density of the mixture can indicate instability in the mixture, which may require immediate attention and care. Detection of increase in vibration can indicate potential damage to the integrity of the structure of the vessel or of the structure that seal off the black cell environment. Thus, temperature, pressure, density, and vibration are some of the variables that should be monitored throughout the sealed period of the black cell environment.

To monitor the condition of the mixture and of the black cell, one approach includes placing different types of sensors (e.g., temperature sensor, vibration sensor, pressure sensor, mixture density sensor, radioactivity sensor, etc.) within the vessel and within the black cell environment. It is noted that because at least some components in the mixture are insoluble, even with the help of the mixers, one or more portions of the mixture can develop conditions that only affect an isolated area within the lumen of the vessel. As such, it is preferable to place the sensors at different locations within the lumen of the vessel to monitor any isolated development of conditions.

Several problems have been identified under this approach. It is also noted that any types of sensors, can deteriorate over time and eventually fail to function properly. Additionally, exposure to radiation can exacerbate the deterioration. It is inevitable that some of the sensors that are placed within the black cell environment will have to be replaced during the sealed period in order to provide continuous monitoring of the condition within the vessel. However, replacement of sensors can be challenging because once the vessel is sealed, one cannot access the inside of the vessel (or even inside the black cell environment) until the sealed period has expired.

Thus, in one aspect of the invention, a system of monitoring a black cell environment using sensors is presented, in which the sensors can be easily replaced during the sealed period of the black cell environment. The black-cell monitoring system includes at least one sealed vessel that is disposed within the black cell environment. The vessel is configured to store a hazardous mixed substance (e.g., a radioactive mixture) and is sealed from the external environment for a pre-determined amount of time (e.g., 1 day, 1 month, 1 year, 50 years, 100 years, etc.). The black-cell monitoring system also includes at least one tubing that extends from the outside of the vessel to the inside of the vessel. The black-cell monitoring system also includes a fiber optic cable that is disposed within the lumen of the tubing. At least a portion of the fiber optic cable is disposed within a portion of the tubing located inside the sealed vessel. The technical effect of this black-cell monitoring system is that the system allows easy replacement of fiber optic cables and sensors for monitoring conditions of hazardous materials within a sealed black cell environment.

Figure 2:
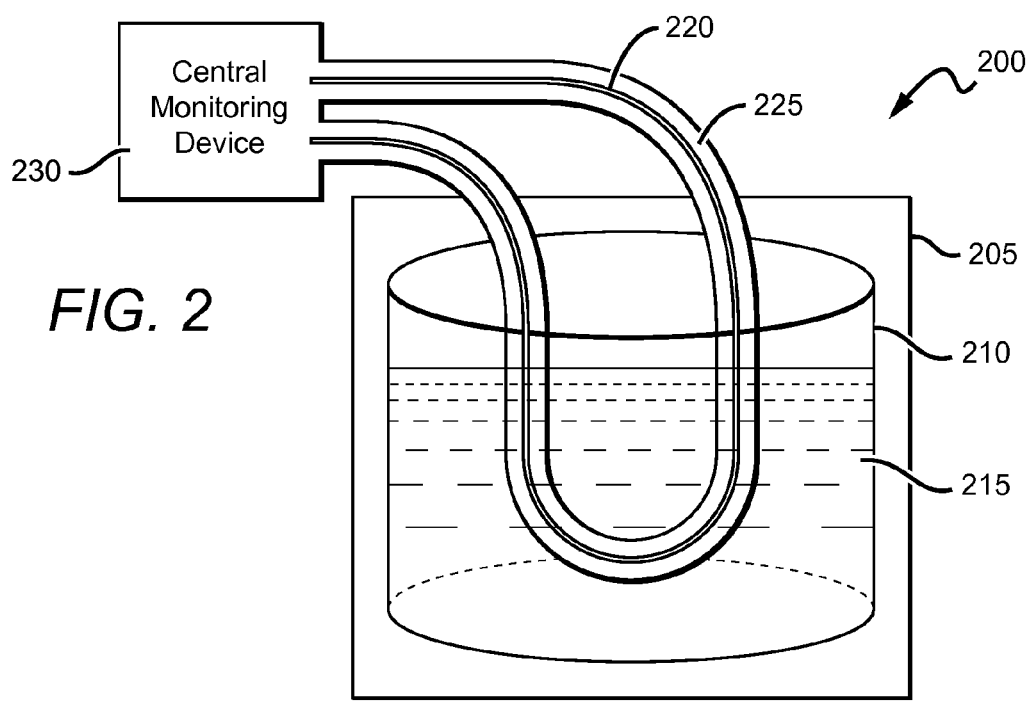
FIG. 2 illustrates a schematic of a black-cell monitoring system of some embodiments.

FIG. 2 illustrates a schematic of such a black-cell monitoring system 200. The black-cell monitoring system 200 includes a black cell environment 205. In some embodiments, the black cell environment 205 can be an enclosed building structure that is made of concrete, steel, or any other materials that can ensure proper sealing of the black cell environment. The system 200 also includes a vessel 210 located within the black cell environment 205. In some embodiments, the black cell environment 205 and the vessel 210 are completely sealed off from the external environment for an extended period of time.

The vessel 210 can be the same as vessel 100 of FIG. 1 and includes mixers configured to mix the hazardous mixture 215. The vessel 210 can be made of concrete, steel, or a combination thereof to improve the strength of the structure. Mixture 215 can include radioactive materials, such as plutonium and uranium. In some embodiments, the mixture 215 requires constant stirring (e.g., by pulsed jet mixers 105 as shown in FIG. 1, not shown in this figure) to maintain stability.

In order to detect changes in condition within the vessel, the black-cell system 200 provides sensors (e.g., temperature sensors, pressure sensors, density sensors, vibration sensors, etc.) that are disposed at different locations within the lumen of the vessel 210. It is contemplated that different types of sensors can be created along a strand of fiber optic cable using commonly known techniques such as Fiber Bragg Gratings. More information about using Fiber Bragg Gratings technique to implement different types of sensors can be found in U.S. Pat. No. 8,280,202 issued to Xia et al. entitled "Fiber-Optic Dynamic Sensing Modules and Methods," filed May 14, 2009, which is incorporated herein by reference.

Instead of directly inserting the fiber optic strand into the mixture 215 within the vessel 210, it is contemplated that a tubing 225 is provided that extends from outside of the vessel 210 to the inside of the vessel 210, and one or more strands of fiber optic cable 220 to be placed within the lumen of the tubing 225. The tubing 225 can be made of materials that are resistant to corrosion and radiation, such as stainless steel. In some embodiments, a portion of the tubing 225 is disposed within the lumen of the vessel 210 such that it is submerged within the mixture 215 when the vessel 210 is filled with the mixture 215. This allows the sensors on the fiber optic strands 220 to measure and collect different sensor data associated with different portion of the mixture 215.

Preferably, the tubing 225 loops back to the outside of the vessel 210 (and more preferably to the outside of the black cell environment 205). This allows any human and/or computing device located outside of the black cell environment 205 to have access to the sensors on the fiber optic strands 220. It is contemplated that the tubing 225 is completely sealed off from the black cell environment 205 and from the mixture 215 within the vessel 210 in order to ensure that the black cell environment 205 and the vessel 210 to be sealed and separated from the external environment. It is also noted that the lumen of the tubing represents part of the external environment, and not part of the black cell environment 205.

As shown in the figure, one or both end of the fiber optic strand 220 comes out from the tubing 225 are connected to a central monitoring device 230. The central monitoring device 230 can be a computing device that is configured to interpret signals (e.g., optic signals) that come from the fiber optic cable 220 to generate sensor data (e.g., temperature data, vibration data, pressure data, density data, radiation data, etc.). In some embodiments, the central monitoring device 230 is also configured to present reports and/or alerts to users based on the sensor data.

Although only one vessel 210 is shown to be within the black cell environment 205 in FIG. 2, more vessels similar to vessel 210 can be disposed within the black cell environment 205.

Figure 3A:
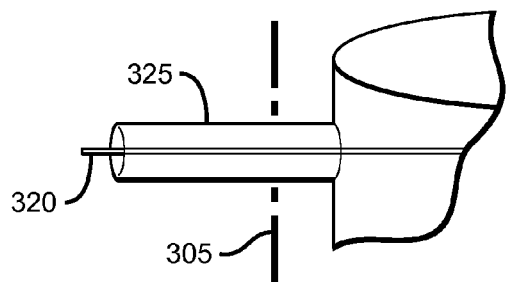
FIGS. 3A and 3B illustrate two alternative methods of disposing a fiber optic cable within the lumen of a tubing.
Figure 3B:
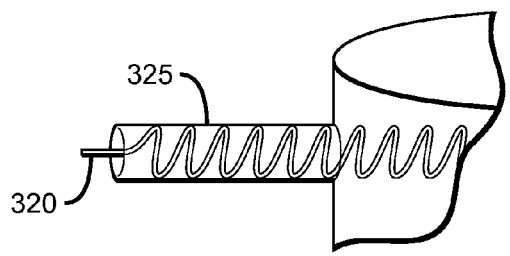

It is contemplated that the fiber optic strand 220 can be disposed within the lumen of the tubing 225 in different ways. FIGS. 3A and 3B illustrate two different approaches in disposing the fiber optic strands 220 inside the lumen of the tubing 225. In FIG. 3A, fiber optic cable strand 320 is disposed within the lumen of tubing 325 in a way that at any given cross-section (e.g., cross-section 305), the tangent of the strand 320 is substantially parallel to (i.e., preferably within 10 degrees of, more preferably within 5 degrees of) the tangent of the tubing 325. Under a different approach, FIG. 3B illustrates that the fiber optic cable strand 320 can also be disposed in a spiral pattern within the lumen of the tubing 325.

Figure 4:
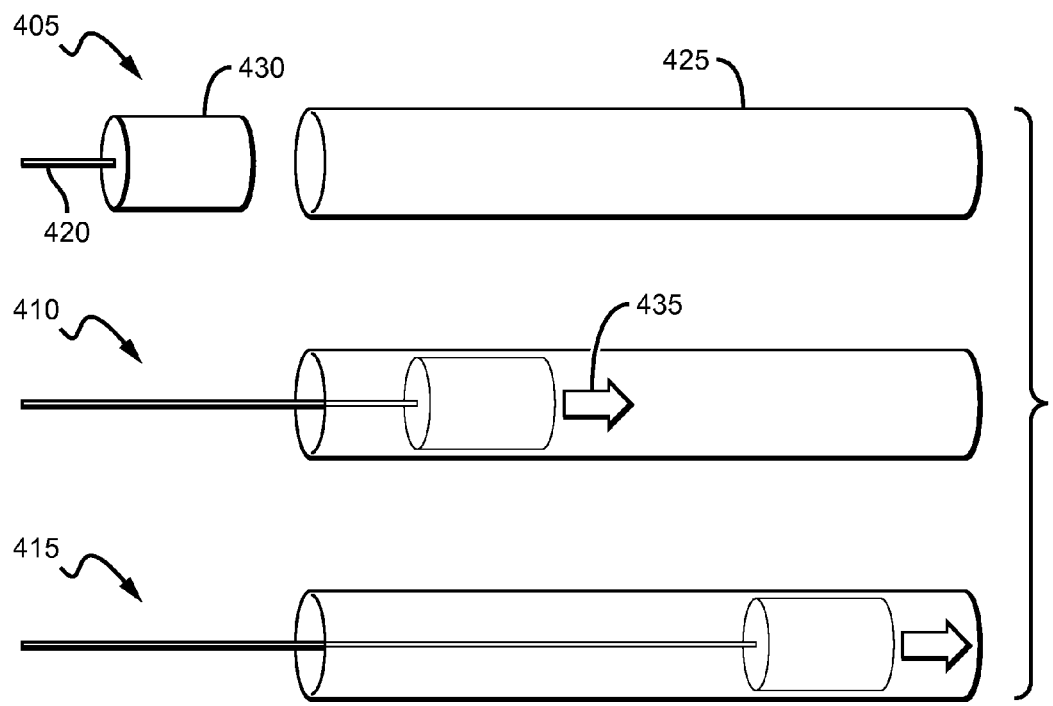
FIG. 4 illustrates a method to insert a fiber optic cable through the lumen of a tubing.

Different embodiments provide different techniques in inserting the fiber optic cable strands through the lumen of the tubing. For example, a widely known technique, "jetting," can be used to insert the cable through the tubing. FIG. 4 illustrates a blowing technique to insert fiber optic cable strand 420 through the lumen of the tubing 425, through three different stages: stages 405, 410, and 415. In stage 405, one end of the fiber optic cable strand 420 is attached to a pig 430. The pig 430 can be cylindrical in shape that fits within the lumen of the tubing 425. The pig 430 also has to be large enough to allow little air to pass through such that when compressed air is exerted against the pig, it forces the pig to move forward. In addition, lubricant can be applied to the exterior surface of the pig (or the interior wall surface of the tubing 425) to improve efficiency.

In stage 410, the pig 430 (attached to one end of the fiber optic cable strand) is disposed within an end of the tubing 425, and compressed air is being exerted against the pig in the direction as indicated by arrow 435. As a result, the pig 430 (and along with the attached fiber cable strand 420) is forced to travel through the lumen of the tubing 425.

In stage 415, the pig 430 continues to travel through the tubing 425, until it reaches the other end of the tubing 425. The ease of inserting the fiber optic cable through the tubing allows for easy replacement of the sensors without accessing the inside of the black cell environment. For example, if a sensor on a fiber optic cable is detected to be malfunction, one can remove the fiber optic cable from the tubing by pulling one end of the fiber optic cable. Then, a new fiber optic cable can be inserted through the lumen of the tubing using the same process as described above. As mentioned above, the lumen of the tubing is completely sealed from the black cell environment and the mixture of the vessel. This way, fiber optic cables (and thus the sensors) can be replaced without accessing the black cell environment and/or the vessel and they can remain to be sealed completely from the external environment.

Figure 5:
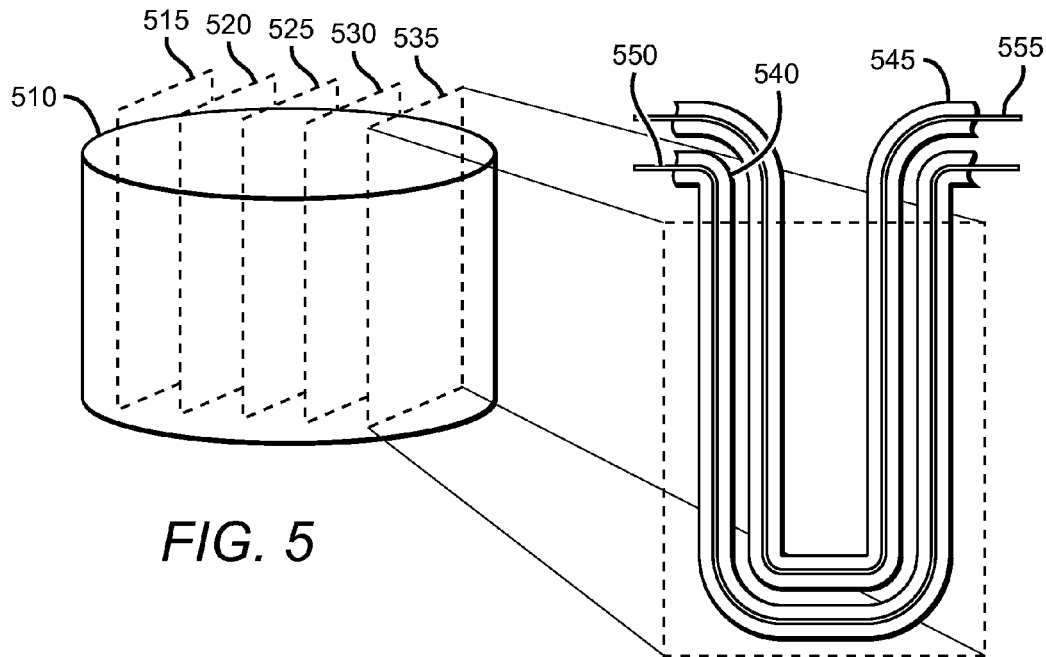
FIG. 5 illustrates one approach in disposing multiple tubings and fiber optic cable strands across the lumen of a vessel.

FIG. 2 shows that the black-cell monitoring system 200 provides one tubing that extends to the lumen of the vessel. It has been contemplated that the black-cell monitoring system 200 can provide more than one tubing so that more sensors can be placed within the lumen of the vessels to cover different areas of the vessel. FIG. 5 illustrates one embodiment for providing multiple tubings in the black-cell monitoring system 200. Specifically, FIG. 5 shows a vessel 510 that is being placed within the black-cell environment. The vessel 510 includes multiple fictional planes 515, 520, 525, 530, and 535 that are added to the vessel 510 for the sole purpose of illustrating this embodiment. The planes 515, 520, 525, 530, and 535 are spread across along one dimension of the vessel 510 (i.e., the planes are cross-sections of the vessel 510). In this embodiment, multiple tubings (such as tubings 540 and 545) and fiber optic cables (such as fiber optic cables 550 and 555) can be installed on each plane to cover more area with the lumen of the vessel 510. Preferably, the tubings do not form any acute angle so that the pig can easily travel through the lumen of the tubings. Although FIG. 5 only shows two tubings for the plane 535, more tubings can be provided to cover even more areas within the lumen of the vessel 510.

These sensors (and fiber optic cables) are all connected to the central monitoring device 230 located outside of the black cell environment. The different sensors that are being placed in the different locations within the lumen of the vessel 510 allow the central monitoring device 230 to generate a three-dimensional (3D) profile of the each vessel within the black cell environment. The 3D profile provides real-time condition of the vessels and locates specific areas with problematic condition. The central monitoring device 230 can also provide a graphical user interface (GUI) to interact with the user regarding the conditions of the black cell environment. The graphical user interface in some embodiments can display a 3D model of the vessels and provide indication of the exact location that requires user's attention based on changes in conditions (e.g., temperature, pressure, density, vibration, radiation, etc.) detected from the sensors.

Figure 6:
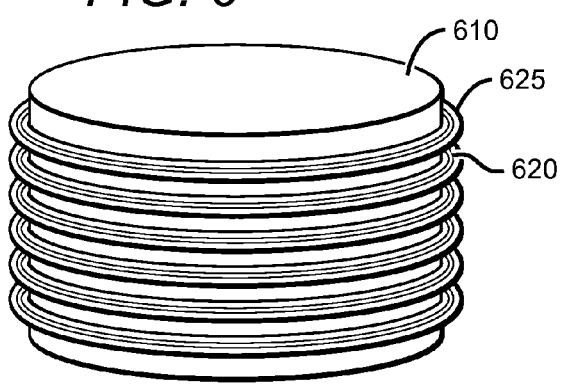
FIG. 6 illustrates one approach in disposing tubings and fiber optic cable strands across the exterior surface of a vessel.
Figure 7:
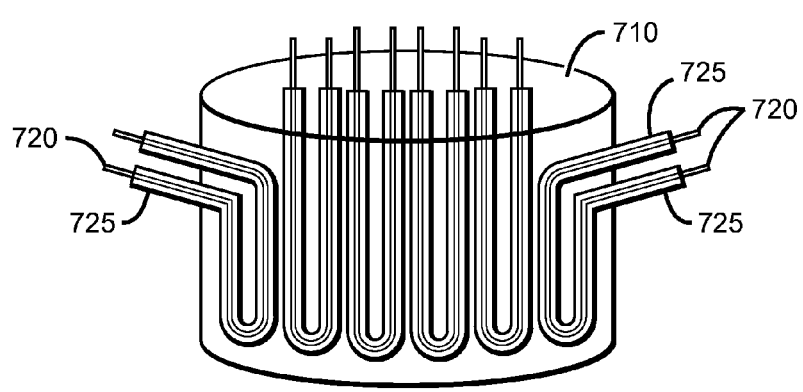
FIG. 7 illustrates an alternative approach in disposing tubings and fiber optic cable strands across the exterior surface of a vessel.

In addition to placing the tubings and fiber optic cables inside the vessel, the tubings and fiber optic cables can be disposed along the exterior surface of the vessel, as shown in FIGS. 6 and 7. FIG. 6 illustrates an arrangement of tubings 625 and fiber optic cables 620 in which the tubings 625 and fiber optic cables 620 wrap around the exterior of the vessel 610 horizontally. FIG. 7 illustrates another arrangement of tubings 725 and fiber optic cables 720 in which the tubings 725 and fiber optic cables 720 are disposed vertically along the exterior surface of the vessel 710.

Figure 8:
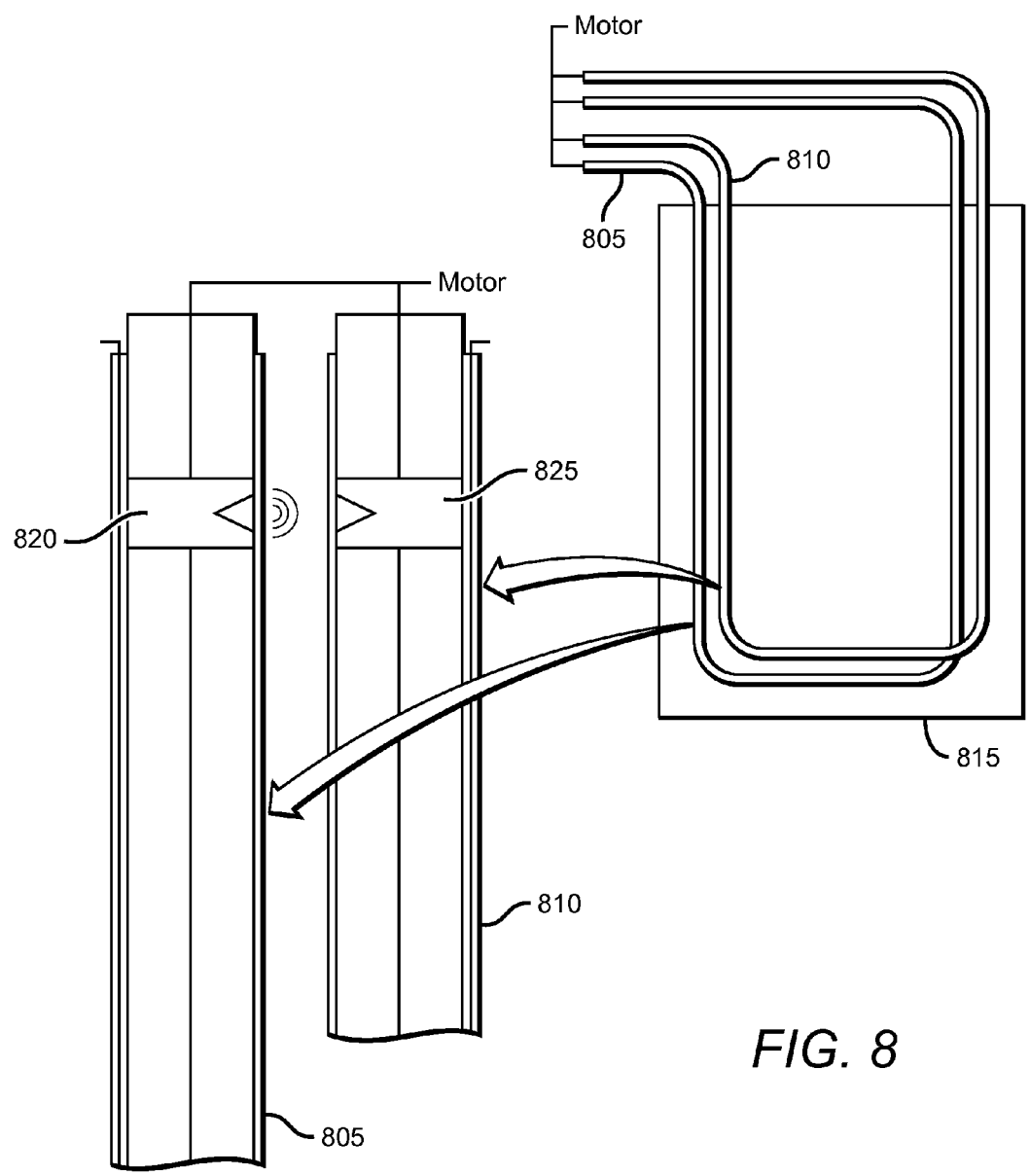
FIG. 8 illustrates a schematic of placing a pair of ultrasonic density detectors within the lumen of a vessel.

In some embodiments, the sensors (e.g., ultrasonic density detector) requires two tubings to be installed in parallel through the lumen of the vessel so that two separate devices (a ultrasonic transmitter and a ultrasonic receiver (or detector)) can be installed in the two tubings respectively. FIG. 8 illustrates an example of the ultrasonic density detector being installed in two parallel tubings. As shown, a pair of tubings (tubing 805 and 810) is disposed within a vessel 815 in a similar manner as described above. Also shown in FIG. 8 are a ultrasonic transmitter 820 that is disposed within the lumen of tubing 805 and a ultrasonic receiver 825 that is disposed within the lumen of tubing 810. Hazardous mixture can flow in between the tubings 805 and 810, and the ultrasonic detector 820 and 825 can detect the density of the mixture that flows between the tubings 805 and 810 by transmitting and receiving ultrasonic signals.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A system for monitoring a black cell environment, the system comprising:
 a vessel disposed within the black cell environment and configured to store a mixed substance;
 a tubing extended from outside of the vessel to inside of the vessel; and
 a cable disposed within a lumen of the tubing, wherein at least a portion of the cable is disposed within a portion of the tubing located inside of the vessel.

2. The system of claim 1, wherein the mixed substance comprises a radioactive sub stance.

3. The system of claim 1, wherein the vessel comprises a pulse jet mixer.

4. The system of claim 1, wherein the tubing comprises a first end and a second end, wherein both the first end and the second end of the tubing are disposed outside of the vessel.

5. The system of claim 1, wherein a first end of the tubing is disposed inside of the vessel and a second end of the tubing is disposed outside of the vessel.

6. The system of claim 1, wherein the cable comprises a sensor.

7. The system of claim 6, wherein the sensor comprises Fiber Bragg Gratings.

8. The system of claim 6, further comprising a computing device coupled to at least one end of the cable and configured to retrieve sensor data from the sensor.

9. The system of claim 8, wherein the sensor data comprises at least one of temperature data, vibration data, and pressure data.

10. The system of claim 9, wherein the computing device is further configured to generate a three-dimensional profile of a condition of the mixed substance inside the vessel based on the at least one of temperature data, vibration data, and pressure data.

11. The system of claim 1, wherein the cable is disposed in a spiral pattern inside the lumen of the tubing.

12. The system of claim 1, wherein a lumen of the vessel is sealed from an external environment and wherein the lumen of the tubing is sealed from the lumen of the vessel.

13. The system of claim 1, wherein the lumen of the tubing is sealed from the black cell environment.

14. A method of replacing a sensor in a black cell environment comprising a sealed vessel and a tubing that extends from the outside of the sealed vessel to the inside of the sealed vessel such that a first portion of the tubing is disposed inside the sealed vessel and a second portion of the tubing is disposed outside of the sealed vessel, wherein a first cable comprising a first sensor is disposed within a lumen of the tubing, the method comprising:
 removing the first cable from the tubing; and
 inserting a different second cable comprising a second sensor into the tubing such that the second sensor is disposed within the lumen of the first portion of the tubing.

15. The method of claim 14, wherein the vessel comprises a mixture of radioactive sub stance.

16. The method of claim 14, further comprising retrieving sensor data from the first sensor.

17. The method of claim 16, wherein the sensor data comprises at least one of temperature data, vibration data, and pressure data.

18. The method of claim 17, further comprising generating a three-dimensional profile of a condition of the mixed substance inside the vessel based on the at least one of temperature data, vibration data, and pressure data retrieved from the first sensor.

19. The method of claim 14, further comprising detecting a malfunction of the first sensor.

20. The method of claim 19, wherein the first cable is removed from the tubing in response to the detecting of the malfunction of the first sensor.

21. The method of claim 14, wherein inserting the second cable comprises blowing the second cable into the lumen of the tubing.

22. The method of claim 14, wherein inserting the second cable comprises attaching a pig to an end of the second cable.

23. A method of installing a sensor in a vessel comprising a tubing that extends from the outside of the vessel to the inside of the vessel such that a first portion of the tubing is disposed inside the vessel and a second portion of the tubing is disposed outside of the vessel, the method comprising:
   inserting a cable comprising a sensor into the tubing such that the sensor is disposed within a lumen of the first portion of the tubing.

24. The method of claim 23, wherein inserting the cable comprises blowing the cable into the lumen of the tubing.

25. The method of claim 23, wherein inserting the cable comprises attaching a pig to an end of the cable.

26. The method of claim 23, wherein the cable is a fiber optic cable.

27. The method of claim 23, further comprising retrieving sensor data from the sensor.

28. The method of claim 27, wherein the sensor data comprises at least one of temperature data, vibration data, and pressure data.

29. The method of claim 28, further comprising generating a three-dimensional profile of a condition of the mixed substance inside the vessel based on the at least one of temperature data, vibration data, and pressure data retrieved from the sensor.

30. The method of claim 23, further comprising attaching a pig to an end of the cable.

31. The method of claim 30, wherein inserting the cable comprises blowing the pig into the lumen of the tubing.

* * * * *